Jan. 8, 1924.
H. DOTZER
BRAKE MECHANISM
Filed Feb. 7, 1921
1,480,049
2 Sheets-Sheet 1
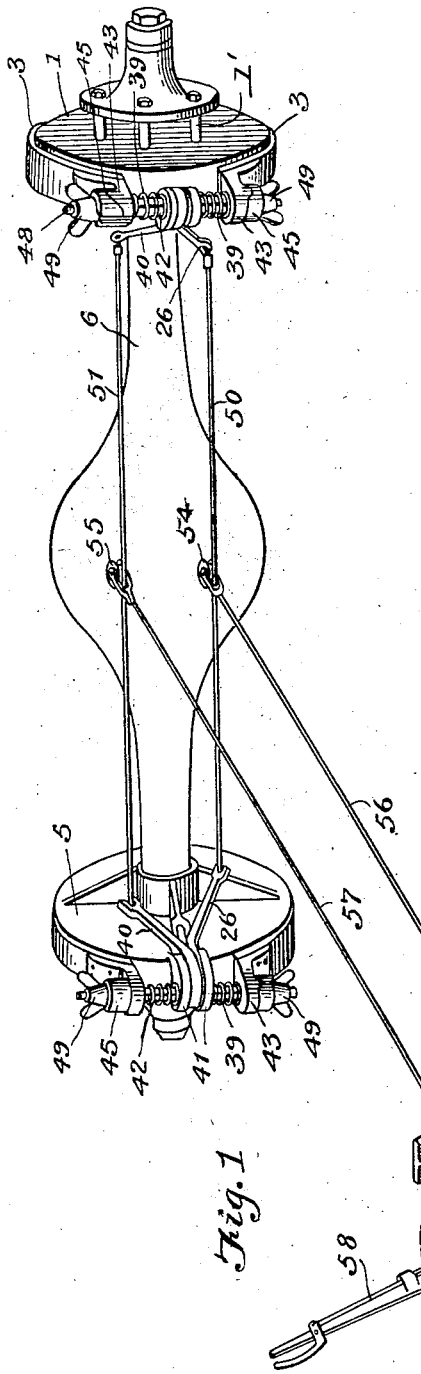
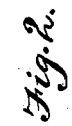
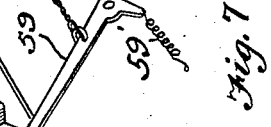
Inventor
HUGO DOTZER
By
Attorney
Richard J. Cook Jan. 8, 1924.  
H. DOTZER  
BRAKE MECHANISM  
Filed Feb. 7, 1921  
1,480,049  
2 Sheets-Sheet 2
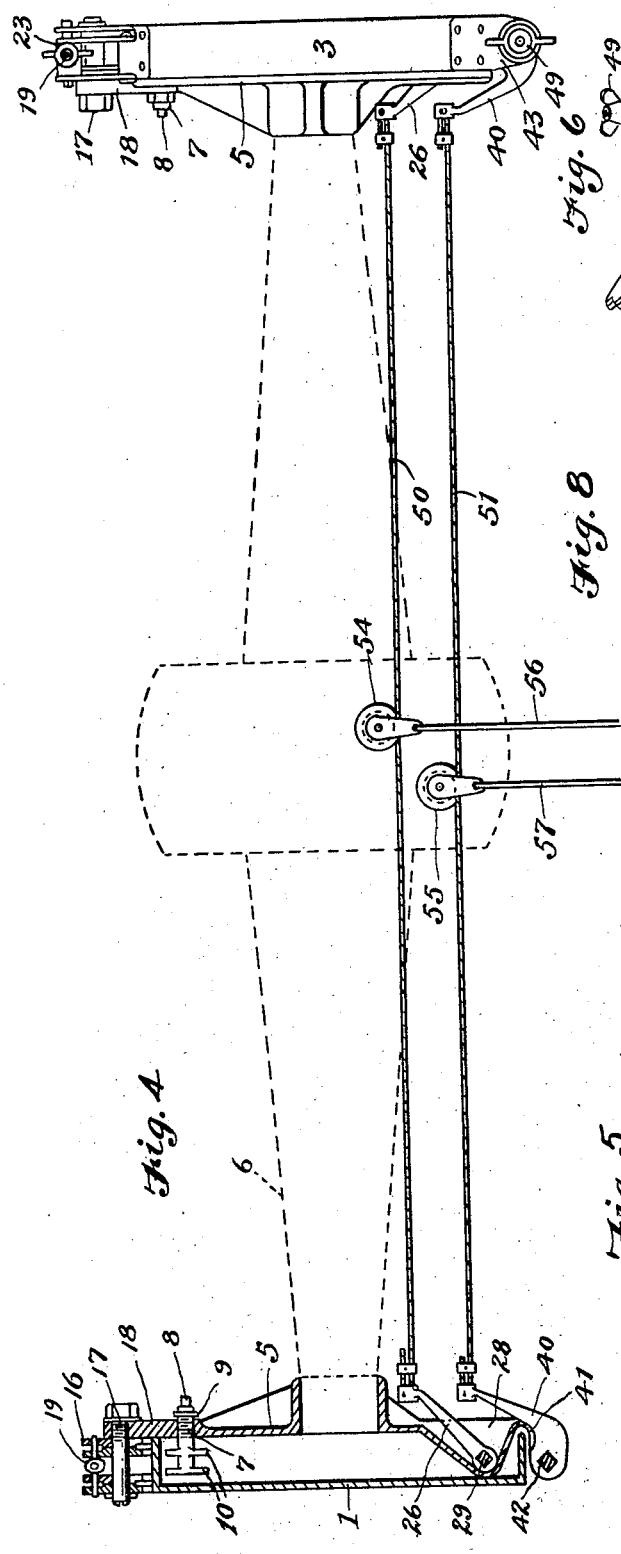
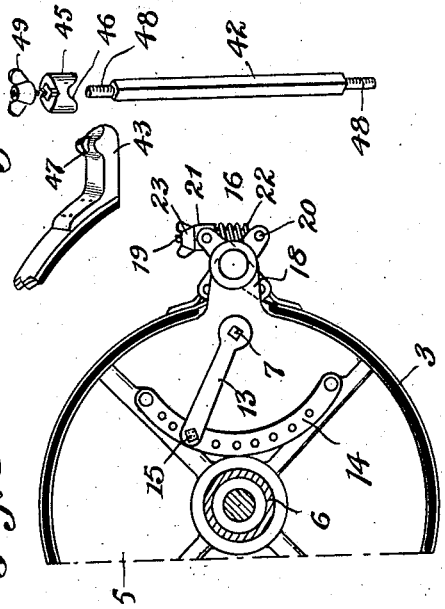
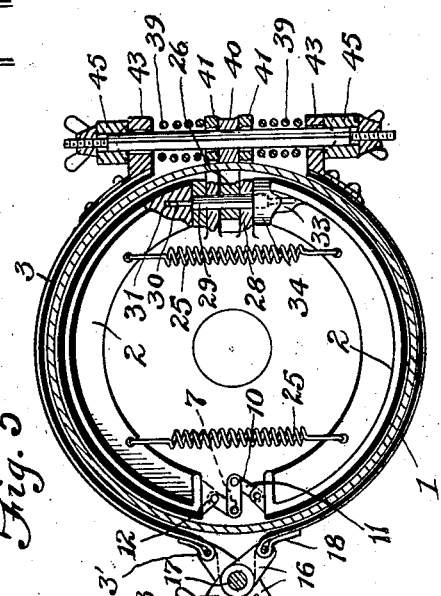
Inventor  
HUGO DOTZER  
Attorney  
Richard J. Cook Patented Jan. 8, 1924.

1,480,049

UNITED STATES PATENT OFFICE.

HUGO DOTZER, OF SEATTLE, WASHINGTON.

BRAKE MECHANISM.

Application filed February 7, 1921. Serial No. 443,015.

*To all whom it may concern:*

Be it known that I, HUGO DOTZER, a citizen of Germany, and a resident of the city of Seattle, county of King, State of Washington, have invented certain new and useful Improvements in Brake Mechanism, of which the following is a specification.

This invention relates to improvements in brakes, and more particularly to brakes and brake control mechanism of that character most commonly used in connection with automobiles, trucks, trailers, or like vehicles, wherein the braking mechanism comprises the common and well known drums, secured at the opposite ends of the vehicle axles, and which are equipped with expandible interior and contractible exterior brake bands, or shoes, controlled through the medium of connecting members operated either by the use of foot pedals, or locking levers, located conveniently accessible to the driver of the vehicle.

It is the object of this invention to provide a substantial, practical and serviceable brake mechanism of the internal, expanding type that is adjustable from the exterior of the drum without necessitating the removal of the vehicle wheel.

It is also an object of the invention to provide a brake construction wherein there is no connection between the braking parts and the vehicle frame and wherein the setting of the brake shoes with respect to the drums remains constant regardless of the variation in the deflection of the springs on which the vehicle body is supported.

In accomplishing these and other objects of the invention, I have provided the improved details of construction, the preferred forms of which are illustrated in the accompanying drawings, wherein—

Figure 1 is a perspective view of the rear axle of a motor vehicle equipped with braking mechanism embodying the present invention.

Figure 2 is an inside face view of one of the brake assemblies, showing the position of the brake levers.

Figure 3 is an edge view of the same.

Figure 4 is a plan view of the axle and brake drums, and the brake controlling cables; one of the drums being shown in section for better illustration.

Figure 5 is a sectional view of a brake assembly taken in a plane perpendicular to its axial line.

Figure 6 is a detail perspective view of a set of exterior brake actuating parts, shown disassembled.

Figure 7 is a similar view of a set of interior brake actuating parts.

Figure 8 is a face view of a brake assembly illustrating an alternative construction for adjusting the interior brake shoes.

Referring more in detail to the drawings the present brake mechanism employs the usual drums 1 which are secured to the interior faces of the wheels at opposite sides of a vehicle by means of bolts 1' and which are adapted to be engaged internally by paired, semi-circular brake shoes 2, and externally by semi-circular bands 3, all of which are equipped with frictional bands of asbestos brake lining, leather or fabric, suitably riveted thereto, and are mounted in operative, functional position upon drum covers or plates, 5, secured to the opposite ends of a non-rotatable axle housing 6.

The two internal brake shoes 2, as here shown, are mounted at their rearward adjacent ends in such manner that they may be adjusted to the drum by an adjusting bolt that extends externally of the drum. This eliminates removing of the wheels to effect this adjustment and consequently makes adjustment quicker and easier than is possible in the usual construction.

This means for mounting and effecting adjustment of the internal brakes is best shown in Figures 4 and 5, and in each brake assembly consists of a bolt 7 that is threaded through the drum cover or plate 5. At their outer ends, these bolts are squared, as shown at 8, so that a wrench may be applied thereto to turn the bolts and effect adjustment when the parts are assembled on the wheel in running position and are equipped with lock nuts 9, that may be tightened against the mounting plates to hold the bolts against turning after they have been adjusted.

At their ends within the drums, the bolts 7 are each equipped with two pairs of oppositely extending arms 10, and pivotally mounted between the ends of each set of arms are the inner ends of toggle links 11, which at their outer ends, are pivotally fixed between ears 12 extending from the adjacent ends of the cooperating brake shoes.

With this manner of connection, it is apparent that by applying a wrench to the squared ends 8 of the bolts 7, the latter may be turned to adjust the shoes toward or from the drum flanges, and that, when a desired adjustment has been made, the bolts may be locked by tightening the nuts 9 against the faces of the drum plates to maintain this adjustment.

As an alternative means of effecting this same adjustment, I may equip the squared ends of the bolts 7 with levers 13 which are movable at their outer ends adjacent arcuate plates 14, secured, as is shown in Figure 8, to the inner faces of the drum plates 5. These levers are provided with threaded openings adapted to be moved into registration with similar spaced apertures in the plates 14, so that after the levers have been swung to effect proper setting, or adjustment, of the shoes 2, a bolt or screw, as shown at 15, may be threaded through the lever aperture and a registering plate aperture, to hold the parts as adjusted.

The external brake band sections 3 of each drum are connected, at their rearward, adjacent ends, through the medium of two pairs of short levers 16 which are centrally pivoted on a bolt 17 that is mounted in a projecting portion 18 of the drum cover 5. In this connection the inner ends of the two pairs of levers are pivotally connected to the ends of the two band sections 3 by removable pins 3', and their outer ends are connected by a bolt 19, that is secured at its lower end to a pin 20 extended between the ends of one set of levers and is slidable through a block 21 to which the ends of the opposite set of levers is secured. A spring 22 is mounted on the bolt between the pin 20 and block 21 to urge them apart and a wing-nut 23 is threaded onto the outer end of the bolt to limit the spreading movement of the links.

Normally, the internal brake shoes of each brake assembly are retained disengaged from their drum flange by a pair of coiled springs 25, best shown in Figure 5, which have their opposite ends secured to the opposite shoes in a manner that will draw the shoes to effect braking contact with the drum flange consists in each assembly of a lever 26, that is mounted within and extends outwardly from a pocket 28 formed in the drum cover 5; the lever being mounted on a cam shaft 29 that extends vertically through the pocket and which is squared except at its ends which terminate in short rounded lengths 30 extended revolubly within sockets 31 in the forward adjacent ends of the drum shoes.

The two ends of these shoes are provided with cam sockets 33, adapted to receive cam heads 34 which are locked against rotation on the shafts 29 to be revolved therewith when the pins are revolved by actuation of the levers 26. The relative setting of the levers 26 and heads 34 on the shafts 29 is such that when the levers 26 are in their rearward position, as shown in Figure 4, the cam sockets will receive the cam heads and thus permit the brake shoes to contract within the drum, while, if the levers are swung forwardly, the cam heads will spread the shoes to braking contact with the drums.

In each assembly the levers 26, and heads 34 are equipped with squared openings for receiving the shaft 29 and need no other locking to the shaft, as it is impossible, after the parts have once been assembled, to disassemble them except by removing the vehicle wheel.

The external brake sections 3 are contracted to braking engagement by means of levers 40 that are pivotally mounted between spaced wings 41, extending forwardly from the plates 5. These levers are fixed on cam shafts 42, extended vertically and revolubly through the said flanges and also through heads 43 fixed to the forward adjacent ends of the brake bands, as is shown in Figures 2 and 3.

Mounted on the ends of the shafts 42 to turn therewith are cam heads 45 provided with cam sockets 46 adapted to co-act with cam faces 47 on the heads 43 so that turning of the shaft by means of the lever will cause the bands to be tightened against the brake drums.

In this construction the levers and cam heads are similar to those of the internal brake mechanism, and the openings through the brake heads 43 are circular to permit the squared shafts to turn therein. The ends of the shafts 42 terminate in small threaded ends 48 whereon thumb nuts 49 are mounted to engage the heads 45 to hold the parts in functional relation, and coiled springs 39 are mounted about the pins between the levers 40 and heads 43 to urge the brake bands normally from braking contact with the drums.

The means for actuating and through which an equalized braking force is automatically placed on the two sides of the vehicle, consists of cables 50 and 51, which respectively connect the inner ends of the internal brake levers 26 and external brake levers 40. Adapted to roll along these cables are pulley wheels 54 and 55, which are mounted in blocks to which cables 56 and 57 are attached. These latter cables are extended forwardly to control mechanism indicated by the lever 58 and foot pedal 59; the latter has a spring 59' fixed to its lower end whereby tension on the cable 56 is overcome at times when the brake with which it is attached is not in use.

With the brake assemblies so constructed and connected by the transverse cables, it is apparent that tension on the cables which connect with the control pedals or levers will be transmitted to the transverse cables and thence to the brake levers. It is also apparent, that, should it require one brake lever to move in a greater arc before its brake parts became effective than is required by the opposite lever of that pair, the pulley will automatically shift itself toward the lever which moves in the greater arc and will, in this way, equalize the tension on the two levers and their brake bands or shoes.

It is also apparent that in the construction described, no parts of the brake mechanism are attached to the vehicle frame but all are mounted on the drum cover and have no movement relative to the wheel, and a constant relation is maintained regardless of the load that may be placed on the vehicle body.

Having thus described my invention, what I claim as new therein and desire to secure by Letters Patent, is:

1. In a brake mechanism, a brake drum, a non-rotative cover for the drum, a pair of brake shoes within the drum, means for contracting and expanding the shoes for braking purposes, and an adjusting bolt mounted in the cover having laterally extending arms at its inner end with toggle link connections with adjacent ends of said shoes and means for locking the bolt at adjusted positions.

2. In a brake mechanism of the character described, the combination with a vehicle wheel having a brake drum secured thereto, a non-rotative cover plate for the drum, a pair of brake shoes within, and adapted to the drum, and means for actuating the shoes against and from the drum, of a shoe adjusting bolt threaded through the drum cover plate provided interiorly of the drum with oppositely extending arms, toggle links secured at opposite ends to said arms and to adjacent ends of said brake shoes; said bolt having a wrench head at its outer end to effect rotation of the bolt to adjust the shoes toward or from the drum and a lock nut on the bolt exterior of the drum plate adapted to be tightened against the plate to retain the adjustment of the bolt.

3. A brake mechanism of the character described, comprising in combination, a brake drum, a non-rotative cover plate for the drum provided with an outwardly opening pocket projecting within and adjacent the periphery of the drum; and having spaced apart horizontal walls provided with vertically alining apertures therein, a pair of brake shoes within and adapted to the drum and pivotally supported at adjacent ends from the cover plate, and having their movable ends terminating at opposite sides of said pocket and provided with socketed cam faces, a squared shaft extending through said pocket apertures and having rounded ends revoluble in said cam face sockets, cam heads mounted on the shaft to engage said cam faces to actuate the shoes outwardly on rotation of the shaft, springs secured at their opposite ends to the opposite shoes to normally retain the same disengaged from the drum, and an actuating lever mounted upon said cam shaft within the pocket and extending therefrom.

4. In a brake mechanism of the character described, the combination with a brake drum and braking means therefor of a non-rotative cover plate for the drum having an outwardly opening pocket extended within the drum, a brake lever supported in said pocket and operatively connected with the braking means.

5. In a brake mechanism, in combination, a brake drum, a non-rotative cover plate having an outwardly opening pocket therein, braking member supported from the cover plate within the drum, an actuating means for said braking members extended into the pocket and a brake lever supported in the pocket and operatively connected to said actuating means.

Signed at Seattle, Washington, this 31st day of January, 1921.

HUGO DOTZER.